United States Patent [19]

Cohly

[11] 3,922,356
[45] Nov. 25, 1975

[54] SULFITE CATALYZED ALUMINUM TANNAGE OF COLLAGEN CASING

[75] Inventor: Mauj A. Cohly, Danville, Ill.

[73] Assignee: Tee-Pak, Inc., Chicago, Ill.

[22] Filed: Apr. 18, 1974

[21] Appl. No.: 462,015

[52] U.S. Cl. ............ 426/277; 8/94.11; 264/202; 426/278
[51] Int. Cl.$^2$ .......................... A23L 1/31
[58] Field of Search ......... 426/105, 140, 277, 278, 426/364; 264/202; 8/94.11

[56] References Cited
UNITED STATES PATENTS

| | | |
|---|---|---|
| 3,425,847 | 2/1969 | Talty .................................. 426/277 |
| 3,511,244 | 5/1970 | Kurilla ............................. 8/94.11 X |
| 3,525,628 | 8/1970 | Cohly .............................. 426/277 X |
| 3,558,262 | 1/1971 | Duffy et al. ......................... 8/94.11 |
| 3,620,775 | 11/1971 | Cohly .................................. 426/277 |
| 3,833,746 | 9/1974 | Cohly .................................. 426/277 |

Primary Examiner—S. Leon Bashore
Assistant Examiner—Arthur L. Corbin
Attorney, Agent, or Firm—Neal J. Mosely

[57] ABSTRACT

This invention relates to an improvement in a process for tanning an edible collagen sausage casing with an aluminum tanning agent which comprises catalyzing the rate of tanning of the collagen by employing a sulfito-aluminum complex rendered partially basic as the aluminum tanning agent.

5 Claims, No Drawings

SULFITE CATALYZED ALUMINUM TANNAGE OF COLLAGEN CASING

BACKGROUND OF THE INVENTION

Edible sausage casings have been developed in recent years and are used primarily in the processing of pork sausages. Non-edible casings of the regenerated cellulose type were unsatisfactory for the processing of pork sausages for two reasons: (1) they were inedible, and (2) they did not transmit the fat released from the sausage during cooking.

Basically, in the preparation of edible collagen casings, hide collagen is converted into a finely divided fibrillar form of a dilute (pH 2.5) slurry of collagen in water, e.g., 2 – 6% collagen content. Then this slurry is extruded through an annular die. The extruded collagen casing is passed into a coagulating bath which dehydrates and neutralizes the collagen and forms a coherent collagen tubular film. At this stage in the process, the coagulated collagen film is hardened or tanned to permit further processing of the film and to provide a film with sufficient strength for use as a sausage casing. Tanning is a necessary step as the coagulated collagen film will revert to a thin slurry if contacted with water. The tanned collagen casings are plasticized in a bath containing a plasticizer, e.g., glycerin, and then dried and wound as flat stock on a reel. The reel stock then is shirred and the shirred casing sold to the meat processor.

DESCRIPTION OF THE PRIOR ART

In the manufacture of sausage casings from a collagen source, it has been customary to use essentially two types of tanning agents: one type is an aluminum salt complex and the other is an aldehyde. Sometimes these are used in a combination, i.e., a first tanning with aluminum and a second tanning with aldehyde. Although ferric salts have been suggested as a possible tanning agent for collagen casings, these agents have been limited on a commercial basis because the iron tends to discolor the casing. Examples of aluminum tanning agents for collagen casing include alum, an aluminum salt such as aluminum citrate formed by combining aluminum sulfate with sodium citrate or citric acid and then neutralized with sodium carbonate or sodium hydroxide to about one-third to two-thrids basic. Examples of aldehydes employed in the tanning of collagen casings include glyoxal and glutaraldehyde.

It has been proposed to tan leather with varius di and trivalent metal salts, e.g., aluminum, chromium, mercury, zinc, as well as with various aldehydes. Because leather is a non-edible product, a variety of non-edible tanning agents can be used for tanning leather whereas these non-edible tanning agents certainly cannot be used in the manufacture of edible sausage casings.

It has been further proposed to use a sulfito complex of chromium in combination with an oxidized polyhydric phenol for the production of such collagen sutures. The sulfito complex is used to insure reduction of hexavalent chromium to trivalent chromium which can be more readily reacted with the collagen than hexavalent chromium. Hence, the rate of tanning of the collagen with the sulfito chromium complex is increased.

SUMMARY OF THE INVENTION

This invention relates to an improvement in a basic process for producing an edible tubular collagen sausage casing which comprises the steps of: extruding a slurry of finely divided collagen in water for forming a tube; coagulating the extruded tube into a coagulating bath containing a coagulating salt; tanning the coagulated tube in a tanning bath containing an aluminum tanning agent; and drying the aluminum tanned tube. The improvement in the basic process resides in catalyzing the rate of tanning of said collagen tube by said aluminum tanning agent which comprises: employing a sulfito-aluminum complex as said aluminum tanning agent. The sulfito-aluminum complex diffuses into the collagen casing and causes tanning to take place in the casing in a substantially shorter period of time, e.g., 1 – 2 minutes, than under the same conditions where the sulfito-aluminum complex is not present, e.g., 4 – 6 minutes.

Advantages of the process of this invention include: the ability to reduce the reaction time required for tanning collagen casing; the ability to more uniformly diffuse an aluminum tanning agent into the collagen casing and thereby produce a more uniformly tanned casing; the ability to improve the strength characteristics of collagen casings; the ability to form a tanned casing which is pliable and soft on exposure to the atmosphere for extended periods of time; the ability to retard bacterial growth in the collagen casing and tanning baths because of the bacteriacidal effect of the sulfito-aluminum complex; the ability to produce a whiter, bleached collagen casing; and the ability to produce a casing having a softer and more tender bite than in those cases where a conventional aluminum complex is employed.

DESCRIPTION OF THE PREFERED EMBODIMENTS

Collagen tissues which are suitable for preparation of extruded collagen casings are obtainable from hide and tendon although hide collagen is preferred for casing manufacture. Until recently, edible collagen casings could not be produced from hide collagen which had been subjected to a liming treatment but, through recent developments, edible collagen casings can be prepared using partially limed (short limed) hides and fully limed hides. A process for producing collagen casings from fully limed hides is found in copending patent application having U.S. Ser. No. 347,293, filed Apr. 2, 1973, inventor Dr. Noel I. Burke and the subject matter of that patent application is incorporated by reference.

If unlimed collagen is to be used in the preparation of an edible collagen casing, the unlimed hide, either fresh, frozen, or salt cured, is defleshed and the hair and epidermal layer mechanically removed, e.g., by abrading, scraping, splitting, etc. The hide is cut into small pieces and passed through a meat grinder until it is reduced to a very small size. The ground collagen then is swollen in a solution of an organic acid, usually lactic acid, to produce an aqueous slurry having a collagen content of from about 2 – 6% and having a pH from about 2.5 – 3.5.

If the collagen to be used in the preparation of edible casing is derived from a partially limed (short limed animal hides) the hide is treated to remove the blood quickly and cut into suitable pieces for the subsequent liming treatment. The lime solution may simply be a saturated solution of lime or maybe a solution containing excess solid lime together with sodium sulfhydrate or dimethylamine sulfate. Generally, treatment in the liming solution is for a period of from about 3 – 12 hours. The hides are split and mechanically abraded to remove the epidermal layer and any remaining hair. The defleshed split or corium layer is cut into small pieces and ground at a temperature less than about 20°C into finely divided form and mixed with sufficient water to form a slurry having a collagen content of from 2 – 6%. The collagen then is swollen with a weak acid such as lactic acid at a pH from about 2.5 – 3.5.

If fully limed collagen is used in the preparation of edible collagen casing, the process of Dr. Burke's can be employed. In that process, the hides are stored in lime to remove the hair, split and mechanically abraded for producing a corium layer. The corium layer than is cut into small pieces, washed with water, and neutralized by treatment with a non-toxic acid such as lactic acid. Then, lactic acid, in a concentration of from 15 – 25%, is added to the collagen to effect swelling. The swollen collagen is passed through a grinder and mixed with water to form a slurry having a collagen content of from about 2 – 6%.

After a collagen slurry is obtained by either of the three processes mentioned above, the collagen slurry is extruded through an annular die to produce a thin-walled product for use as a sausage casing. Generally, the collagen slurry is extruded through a die having counter-rotating inner and outer parts. One type of annular die is shown in Becker, U.S. Pat. No. 2,046,541.

The collagen slurry is extruded through the die into a coagulating bath containing a coagulating salt. Generally, this salt is a concentrated solution of sodium sulfate or ammonium sulfate. Sometimes the coagulating bath contains a slight proportion of alkali, e.g., sodium hydroxide or ammonium hydroxide to neutralize excess acid carried by the casing. Typical coagulating baths comprise a concentrated solution of ammonium sulfate and sufficient ammonium hydroxide to maintain a pH of from about 9 – 10. Although the above coagulating baths have been suggested as being operable in the practice of the invention, other coagulating baths which dehydrate and collapse the collagen to form a coherent film can be used as desired.

After the extruded film has been coagulated into a coherent film, it is then passed into a tanning bath for hardening the collagen casing. As mentioned previously, if the collagen casing is not hardened or tanned, the casing on contact with water will revert to a thin slurry.

Conventionally, it had been proposed to use aluminum salts, preferably in an olated form to tan collagen, but these salts were unsatisfactory from the standpoint that tanning required moderate processing or reaction time and the casing had a tendency to split during frying. As mentioned previously, these aluminum salts were aluminum citrate salts rendered partially basic with sodium carbonate or sodium hydroxide.

In practicing this invention, the aluminum tanning agent employed is a sulfito-aluminum complex. The sulfito-aluminum complex can be prepared by contacting an aluminum tanning agent with sufficient sulfite providing material to form such sulfito-aluminum complex. These sulfite providing materials can be added directly to the tanning baths containing the aluminum tanning agent for forming the sulfito-aluminum complex or to the coagulating bath.

Examples of aluminum tanning agents for forming the sulfito-aluminum complex are the aluminum salts of weak organic acids such as citric, formic, acetic, tartaric, and the like. For preferred results, the aluminum salts are rendered about one-third to two-thirds basic by addition of suitable alkali, e.g., sodium carbonate or sodium hydroxide. Alum, which is ammonium aluminum sulfate hydrate, can also be used for forming the sulfito-aluminum tanning agent.

Any sulfite providing material can be added to the tanning bath containing the aluminum tanning agent for forming the sulfito-aluminum complex. Generally, the sulfite providing materials are the alkali metal sulfites, e.g., sodium, potassium, and lithium, and ammonium sulfite and bisulfites thereof.

A closed system (non-vented) is preferred in the formation of the sulfito-aluminum complex for two reasons. The closed system tends to prevent the escaping of sulfur dioxide from the tanning bath. As is known, sulfur dioxide may have a deleterious effect upon operating personnel. The other reason is that a closed system forces the reaction of sulfite providing material with the aluminum complex to the sulfito-aluminum complex as opposed to an aluminum salt complex and sulfur dioxide.

Although not intending to be bound by theory, it is believed the sulfite providing material reacts with the aluminum tanning agent to form a sulfito-aluminum III ion. The lability of this ion in tanning collagen casing suggests that the sulfito-aluminum III ion has the linkage $ALOSO_2$ and not $ALSO_3$. Thus, the aluminum oxygen bond is preserved in the formation of the sulfito-aluminum III ion. This ion can penetrate into the collagen and effect tanning in a much shorter time than basic aluminum complexes. These "mixed ligands" of sulfito-aluminum complex substantially eliminate the formation of $AL(OH)_3$ during tanning and maintain the solubility of the tanning agent. There is a tendency of the aluminum tanning agent to form quantities of $AL(OH)_3$ in conventional baths.

In carrying out the tanning process of this invention, the sulfite providing material can be added either prior to, simultaneously with or subsequent to contact with the aluminum tanning agent. For example, the sulfite providing material can be added to the coagulating bath for impregnation into the casing and then the casing passed into the tanning bath containing the aluminum tanning agent. The sulfite providing material can also be added to the tanning bath containing the aluminum tanning agent wherein the sulfito-aluminum complex is formed in the bath and the sulfito complex permitted to penetrate into the casing. Also contemplated by the process is the contacting of the coagulated casing with the aluminum tanning agent prior to contact with the sulfite providing material. In the latter instance, the aluminum tanning agent has penetrated into the casing and then permitted to come in contact with the sulfite providing material for forming the sulfito-aluminum complex. Generally though, the properties of the casing are significantly better when the casing is contacted with the sulfite providing material prior to or simultaneously with the contacting of the aluminum tanning agent.

Tanning of the collagen casing conventionally has been effected by forming a tanning bath comprising a solution containing from about 10 – 20% aluminum sulfate, $AL_2(SO_4)_3 \cdot 14 H_2O$, 3 – 7% of an alkali metal salt of a weak organic acid, e.g., sodium citrate, and 3 – 7% of an alkali, e.g., sodium carbonate or sodium hydroxide and contacting the casing therewith; these proportions for the components are guidelines for the manufacture of tanning baths employing aluminum tanning agents and the proportions may vary depending upon the aluminum tanning agent to be employed and the properties desired in the casing. However, the proportion for aluminum tanning agents in the bath can be varied as desired. Typically, the collagen casing will contain from about 0.5 –5% aluminum based on the weight of the collagen in the resultant casing.

The sulfite providing material normally is added to the conventional baths as noted above in a proportion of about 0.25 – 2% by weight of the bath. This proportion of sulfite providing material is calculated to provide sufficient sulfite to satisfy from one-sixth to one-third equivalents based on the aluminum atom. Often when higher concentrations of sulfite providing material are employed, i.e., when the sulfite providing material satisfies more than one-third of the equivalents of the aluminum atom, the advantageous features found in the casing are lost. For example, when the sulfite concentration is too high, the casing tends to become brittle and is not soft or tender to the bite. Additionally, there is a tendency for the sulfite providing material to decompose to sulfurous acid which then can decompose to sulfur dioxide in water. This presents environmental problems with respect to plant personnel.

Tanning of collagen casings typically is performed in about five minutes and is effected by passing the casing over a series of bars in the baths. With the sulfito-aluminum complex, the tanning rate is substantially increased. Experimental evaluation has shown that residence times of from 1 – 2 minutes are effective for tanning the casing to sufficient strength for processing. Of course, this process is amenable to a second tanning operation, as for example, with an aldehyde as are conventional aluminum tanning processes.

The following examples are provided to illustrate preferred embodiments of the invention and are not intended to restrict the scope thereof. All percentages are expressed as weight percentages.

EXAMPLE 1

Four sample collagen casings are prepared in a conventional commerical manner by extruding a collaen slurry containing from about 2 – 6% collagen in water and having a pH of about 2.5 through an extrusion die. The extruded casings then are coagulated in identical conventional ammonium sulfate/caustic soda coagulating baths.

Sample A is a control and is tanned in a conventional bath containing 10% $AL_2(SO_4)_3 \cdot 14 H_2O$, 2.5% NAOH, and 2.4% sodium citrate . $2H_2O$.

Sample B is tanned in a bath identical to that employed for the tanning of Sample A except that 0.5% sodium sulfite is added to the tanning bath.

Sample C is tanned in a bath identical to that of Sample A except that 1% sodium sulfite is added to the aluminum tanning bath.

Sample D is tanned in a bath identical to that of Sample A except that 2% sodium sulfite is added to the bath.

The residence time for tanning of Samples B, C, and D is the same as that employed in Sample A, i.e., about 5 minutes. This is typical. After tanning, the casings are washed, plasticized with glycerin, and dried in identical manner.

Samples B, C, and D when analyzed show that they are free from trace amounts of $AL(OH)_3$ and $AL_2O_3$ whereas Sample A has trace amounts of both these elements. Samples B and C have excellent stuffing and frying response, are soft and tender, and remain pliable and flexible on exposure to normal environmental conditions for extended periods of time. On the other hand, Sample A has a tougher bite than does Sample B and Sample C and does not have the outstanding stuffing and frying response of these latter two casings. Sample D is somewhat tougher than Sample B and Sample C casings and when exposed to environmental conditions for the same extended period of time is substantially more brittle than these casings. Rewet strengths for each of the casings as measured after the casing has been completely processed including drying and then wet with water are as follows: Sample A—1150 g; Sample B—1300 g; Sample C—1200 g; and Sample D—1250 g. These breakload strengths show that there is a strength increase in collagen casings when tanned with the sulfito-aluminum complex as opposed to an aluminum complex.

EXAMPLE 2

A collagen casing processed identically to that of Sample B in the above example is prepared except that the aluminum tanned casing is washed with water after tanning and the casing then passed through a glutaraldehyde tanning bath containing about 0.05% glutaraldehyde. The collagen casing is washed to remove unreacted glutaraldehyde, plasticized, and dried in the same manner as Sample B. The dry collagen casing is very soft and tender and has increased rewet breakload strength over Sample B.

I claim

1. In a process for producing a tubular collagen sausage casing which comprises the steps of extruding a slurry of finely divided collagen in water for forming a tube, coagulating the extruded tube in a coagulating bath containing a coagulating salt, tanning the coagulated tube in a tanning bath containing an aluminum tanning agent, and drying the aluminum tanned tube, the improvement for catalyzing the rate of tanning of said collagen tube by the aluminum in said aluminum tanning agent which comprises employing a sulfito-aluminum complex, containing a proportion of sulfite sufficient to satisfy one-sixth to one-third equivalents sulfite based on the aluminum, as said aluminum tanning agent.

2. The process of claim 1 wherein a sulfite providing material is added to the coagulating bath or the tanning bath containing the aluminum tanning agent in an amount sufficient for forming said sulfite-aluminum complex.

3. The process of claim 2 wherein said aluminum tanning agent is employed in said aluminum tanning bath in a proportion of from about 10 – 20% by weight for providing from about 0.5 – 5% aluminum based on the weight of the collagen in the collagen casing, and said bath contains about 0.25 – 2.0% wt. of said sulfite-providing material.

4. The process of claim 3 wherein said sulfite providing material is selected from the group consisting of alkali metal sulfites, ammonium sulfite, alkali metal bisulfites, and ammonium bisulfite.

5. The process of claim 4 wherein said alkali metal sulfite is sodium sulfite.

* * * * *